(12) United States Patent
Worden

(10) Patent No.: US 11,846,310 B2
(45) Date of Patent: Dec. 19, 2023

(54) APPARATUSES AND ASSEMBLIES FOR A SOLAR PANEL INSTALLATION WITH T-BOLT AND CLAMP

(71) Applicant: Gamechange Solar Corp., Norwalk, CT (US)

(72) Inventor: Andrew Barron Worden, Redding, CT (US)

(73) Assignee: GAMECHANGE SOLAR CORP., Norwalk, CT (US)

( * ) Notice: Subject to any disclaimer, the term of this patent is extended or adjusted under 35 U.S.C. 154(b) by 191 days.

(21) Appl. No.: 17/153,151

(22) Filed: Jan. 20, 2021

(65) Prior Publication Data
US 2022/0010822 A1    Jan. 13, 2022

Related U.S. Application Data

(60) Provisional application No. 62/964,212, filed on Jan. 22, 2020.

(51) Int. Cl.
*F16B 2/06* (2006.01)
*H02S 30/00* (2014.01)

(52) U.S. Cl.
CPC ............. *F16B 2/065* (2013.01); *H02S 30/00* (2013.01)

(58) Field of Classification Search
CPC .......... F16B 2/065; F16B 4/004; F16B 23/00; F16B 33/00; F16B 35/048; F16B 35/06; F16B 43/00; B21H 3/04; F24S 25/636
See application file for complete search history.

(56) References Cited

U.S. PATENT DOCUMENTS

| 3,032,281 | A | * | 5/1962 | Wexell | B27L 11/005 411/401 |
| 4,729,707 | A | | 3/1988 | Takahashi | |
| 4,850,063 | A | | 7/1989 | Abbate | |
| 5,655,431 | A | | 8/1997 | Pierce | |
| 7,435,134 | B2 | * | 10/2008 | Lenox | F24S 25/20 52/173.3 |
| 2011/0100434 | A1 | * | 5/2011 | Van Walraven | F24S 25/636 136/251 |
| 2011/0214365 | A1 | * | 9/2011 | Aftanas | F24S 25/636 52/173.3 |
| 2011/0299957 | A1 | * | 12/2011 | Young | F24S 25/636 411/401 |

(Continued)

OTHER PUBLICATIONS

International Search Report and Written Opinion for PCT/US21/14509, dated Jun. 7, 2021, ISA/US.

*Primary Examiner* — Robert Sandy
*Assistant Examiner* — Rowland Do
(74) *Attorney, Agent, or Firm* — O'Shea P.C.

(57) ABSTRACT

A bolt comprises a first shank segment axially comprising an externally threaded segment at a proximate axial end of the bolt. The bolt also includes a second shank segment, a flange extending perpendicularly a first distance from the first shank segment and axially located between a distal axial end of the first shank segment and a proximate axial end of the second shank segment, and a head axially adjacent to a distal axial end of the second shank segment, where the head is longer than the flange in a first direction perpendicular to the first shank segment but shorter than the flange in a second direction perpendicular to the first shank segment.

9 Claims, 9 Drawing Sheets

(56) References Cited

U.S. PATENT DOCUMENTS

| | | | | |
|---|---|---|---|---|
| 2014/0010616 | A1* | 1/2014 | Meine | F16B 7/187 |
| | | | | 411/190 |
| 2015/0052712 | A1* | 2/2015 | Markiewicz | H01L 31/02 |
| | | | | 24/569 |
| 2015/0311606 | A1* | 10/2015 | Meine | F24S 25/636 |
| | | | | 439/100 |
| 2017/0063300 | A1* | 3/2017 | Ash | H02S 20/23 |
| 2018/0062571 | A1* | 3/2018 | Ash | H02S 20/23 |
| 2019/0162217 | A1* | 5/2019 | Vovan | F16B 19/1063 |
| 2019/0242426 | A1* | 8/2019 | Moore | B21K 1/46 |

* cited by examiner

APPARATUSES AND ASSEMBLIES FOR A SOLAR PANEL INSTALLATION WITH T-BOLT AND CLAMP

CROSS REFERENCE TO RELATED APPLICATIONS

This application claims the benefit of U.S. Provisional Patent Application Ser. No. 62/964,212 filed Jan. 22, 2020, which is hereby incorporated by reference.

BACKGROUND OF THE INVENTION

1. Technical Field

This disclosure relates generally to solar panel installation and, more particularly, to apparatuses and assemblies for use in a solar panel installation.

2. Background Information

Solar panels can be secured to mounting systems using clamping brackets such as end clamps and mid clamps. Mid clamps are designed to be positioned between two solar panels and include two clamping surfaces where each clamping surface engages the frame of a corresponding one of the solar panels. End clamps have a single clamping surface and are generally designed to engage the top of the frame of a single solar panel.

Fast and secure installation is important given the relatively large size of solar farms. There is a need for an improved bolt and clamps for quickly and safely securing solar panels to their mounting system.

SUMMARY OF THE DISCLOSURE

Aspects of the disclosure are directed to a bolt that comprises a first shank segment axially comprising an externally threaded segment at a proximate axial end of the bolt. The bolt also includes a second shank segment co-axial with the first shank segment, a flange extending perpendicularly a first distance from the first shank segment and axially located between a distal axial end of the first shank segment and a proximate axial end of the second shank segment, and a head axially adjacent to a distal axial end of the second shank segment, where the head is longer than the flange in a first direction perpendicular to the first shank segment but shorter than the flange in a second direction perpendicular to the first shank segment.

The first shank segment may comprise a segment comprising a plurality of sidewalls.

The head may comprise first and second parallel sidewalls, a first corner radius separating the first and second parallel sidewalls at a first end, and a second corner radius separating the first and second parallel sidewalls at a second end.

The first shank segment may include a polygonal cross section along an axial plane.

The second shank segment may be cylindrical.

The plurality of sidewalls may include a first planar sidewall surface and a second planar sidewall surface that this parallel to the first planar sidewall surface, and the plurality of sidewalls includes a third planar sidewall surface and a fourth planar sidewall surface that is parallel to the third planar sidewall surface, and the first and third planar sidewall surfaces are perpendicular.

The plurality of sidewalls may include a first planar sidewall surface and a second planar sidewall surface that this parallel to the first planar sidewall surface, and the plurality of sidewalls includes a third planar sidewall surface and a fourth planar sidewall surface that is parallel to the third planar sidewall surface, and the first and third planar sidewall surfaces are perpendicular, where adjacent one of the plurality of sidewalls are separated by a radiused end.

The head may be configured as a T-bolt head.

The bolt may further comprise a radially extending clamp support surface at a distal axial end of the externally threaded segment.

The bolt may comprise a radially extending clamp support surface at a distal axial end of the externally threaded segment, where the radially extending clamp support surface is unitary with the first shank segment.

The bolt may further comprise a radially extending clamp support surface at a distal axial end of the externally threaded segment, where the radially extending clamp support surface is formed by an O-ring.

Aspects of the disclosure are also directed to an assembly comprising a bolt, a clamp and a fastener. The bolt comprises a first shank segment axially comprising an externally threaded segment at a proximate axial end of the bolt, a second shank segment co-axial with the first shank segment, a radially extending clamp support surface at a distal axial end of the externally threaded segment, a flange radially extending a first distance from the first shank segment and axially located between a distal axial end of the first shank segment and a proximate axial end of the second shank segment, and a head axially adjacent to a distal axial end of the second shank segment. The clamp comprises a base surface that includes an aperture and support tabs extending downwardly from the base surface at opposing sidewall ends of the aperture, where the externally threaded segment extends through the aperture and the support tabs contact the radially extending clamp support surface to position the clamp axially along the bolt. The fastener engages the externally threaded segment to secure the clamp to the bolt.

The first shank segment may comprise a segment comprising a plurality of sidewalls.

The radially extending clamp support surface may comprise an O-ring.

The radially extending clamp support surface may be unitary with the first shank segment.

The clamp further may comprise an axial sidewall surface that is substantially parallel with the first shank segment and from which the top surface radially extends, first and second radial corners of the axial sidewall surface that comprise serrated edges that bend downwardly from the top surface, and first and second spacing fingers extending radially from the axial sidewall surface.

The fastener may comprise a serrated flange nut.

The clamp may further comprise serrated edges at corners of the top surface that bend downwardly from the top surface and elongated downwardly bent side portions extending from radial end surfaces of the top surface.

The head may comprise first and second parallel sidewalls, a first corner radius separating the first and second parallel sidewalls at a first end, and a second corner radius separating the first and second parallel sidewalls at a second end.

The first shank segment may include a polygonal cross section along an axial plane and where the radially extending clamp support surface is formed by one of an O-ring or is integral with the bolt.

The foregoing features and the operation of the invention will become more apparent in light of the following description and the accompanying drawings.

DETAILED DESCRIPTION

Figure 1:
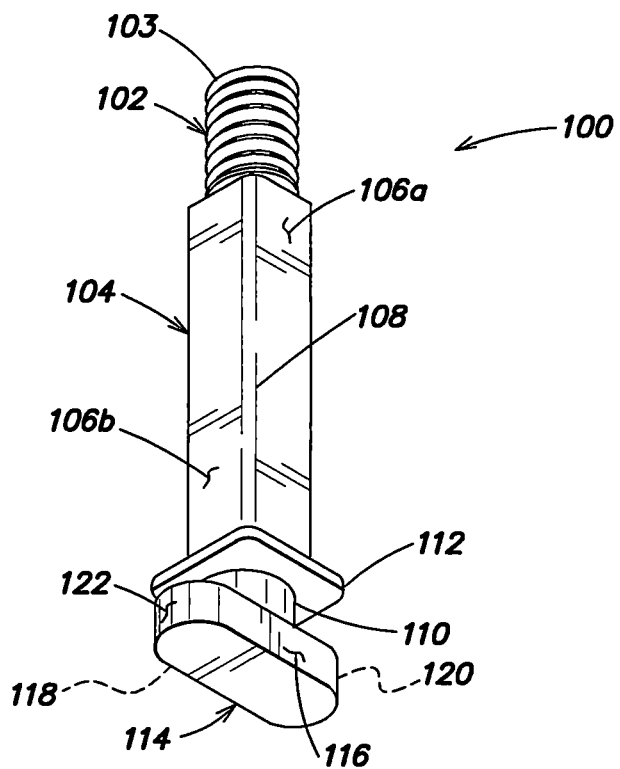
FIG. 1 is a first perspective view of a bolt according to a first exemplary embodiment.
Figure 2:
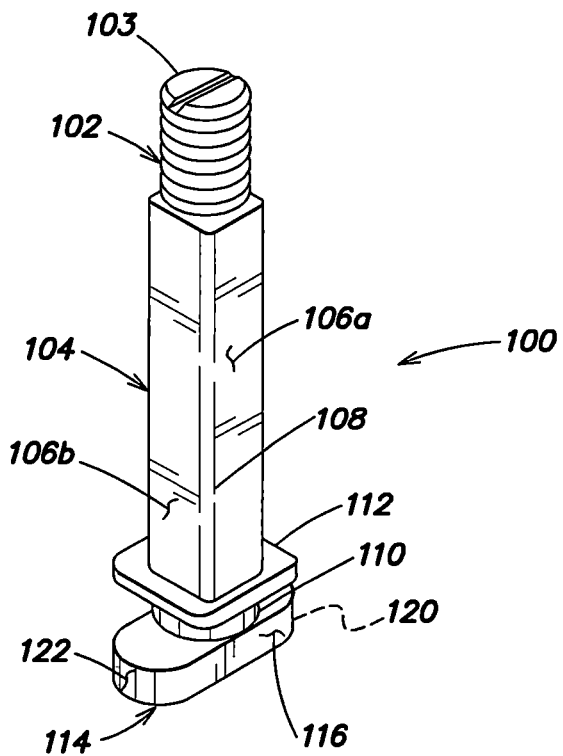
FIG. 2 is a second perspective view of the bolt of FIG. 1.
Figure 3:
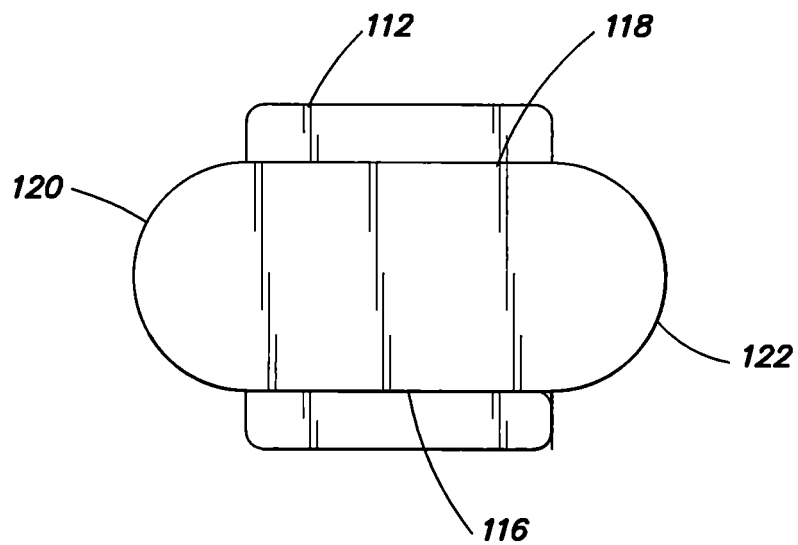
FIG. 3 is a top view of the bolt illustrated in FIGS. 1 and 2.

FIG. 1 is a first perspective view of a bolt 100 according to a first exemplary embodiment of the disclosure. FIG. 2 is a second perspective view of the bolt 100 of FIG. 1. FIG. 3 is a top view of the bolt illustrated in FIGS. 1 and 2. Referring to FIGS. 1-3, the bolt 100 includes an externally threaded segment 102 at a proximate axial end 103 of the bolt, and a first shank segment 104 axially adjacent to the externally threaded segment 102. The first shank segment 104 comprises a plurality of sidewalls 106a-106d (only sidewalls 106a and 106b shown), where each adjacent ones of the plurality of sidewalls are separated by a radiused edge 108. It is contemplated that the first shank segment 104 may be one of various cross-sectional shapes including polygonal, cylindrical, multiple radii or even a combination of various cross-sectional shapes. In the exemplary embodiments of FIGS. 1-3, the plurality of sidewalls may have planar surfaces, but of course other curved or other surfaces may be used. The bolt 100 also includes a second shank segment 110, and a bolt flange 112 radially extending from the first shank segment 104 and axially located between a distal end of the first shank segment 104 and a proximate end of the second shank segment 110. A head 114 is axially adjacent to a distal end of the second shank segment 110.

The head 114 may be configured to provide a T-bolt. For example, the head may comprise first and second parallel/opposing sidewalls 116, 118, a first radiused wall 120 separating the first and second parallel/opposing sidewalls 116, 118 at a first end, and a second radiused wall 122 separating the first and second parallel/opposing sidewalls at a second end. This is generally referred to as stadium shaped (i.e., constructed of a rectangle with semicircles at a pair of opposite sides). Of course, the shape of the head 114 is not limited to the foregoing exemplary configuration. It is contemplated that the head 114 may be one of various known shapes, including oval, oblong, et cetera.

Figure 4:
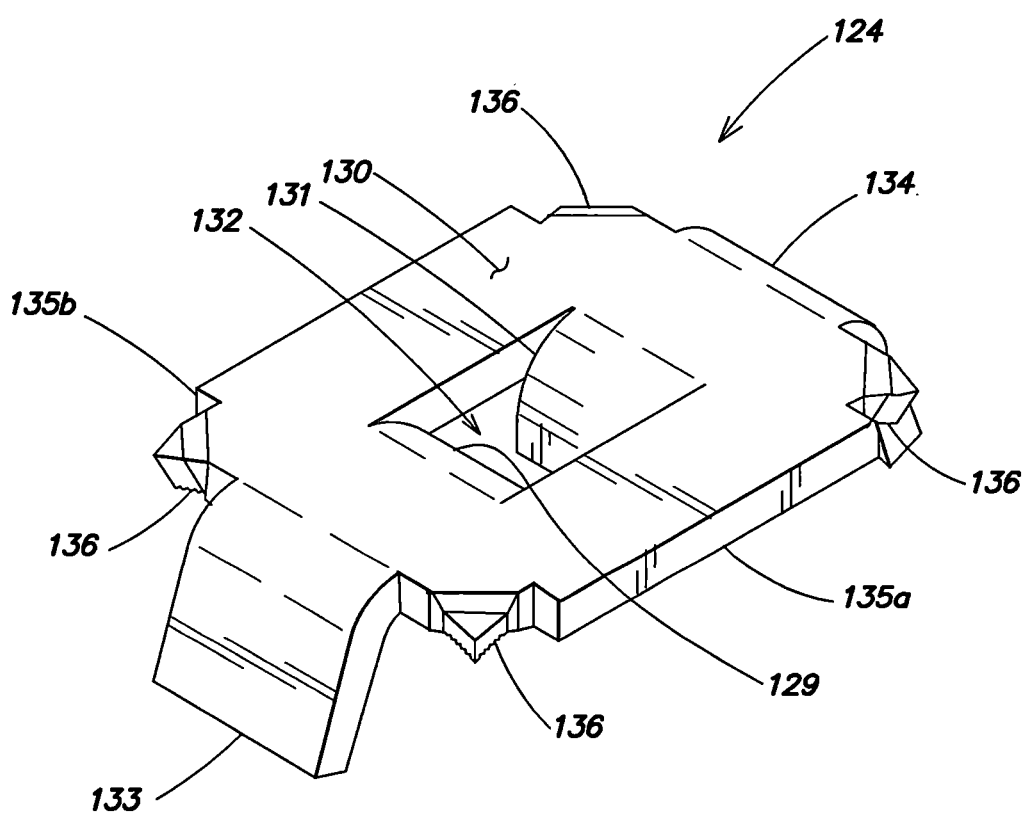
FIG. 4 is a pictorial illustration of a first exemplary embodiment of a clamp.

FIG. 4 is a pictorial illustration of a first exemplary embodiment of a clamp 124 (e.g., a mid-clamp used for the installation of solar panels into a mounting rack). The clamp 124 includes a base surface 130 that has a central opening 132 formed therein and elongated downwardly bent side portions 133, 134 that extend from the base surface 130. The clamp also includes clamp flanges 135a, 135b. The central opening 132 may be polygonal, circulator or oblong shaped and sized to allow the externally threaded segment 102 of the bolt 100 (FIG. 1) to pass through the central opening 132.

Figure 5:
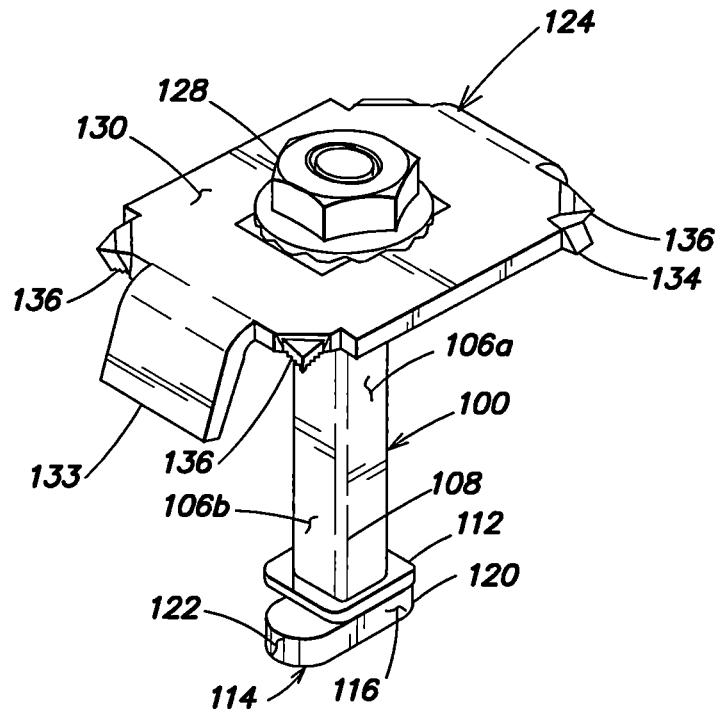
FIG. 5 is a first perspective view of the bolt of FIGS. 1-3 and the clamp of FIG. 4 operatively secured by a fastener.
Figure 6:
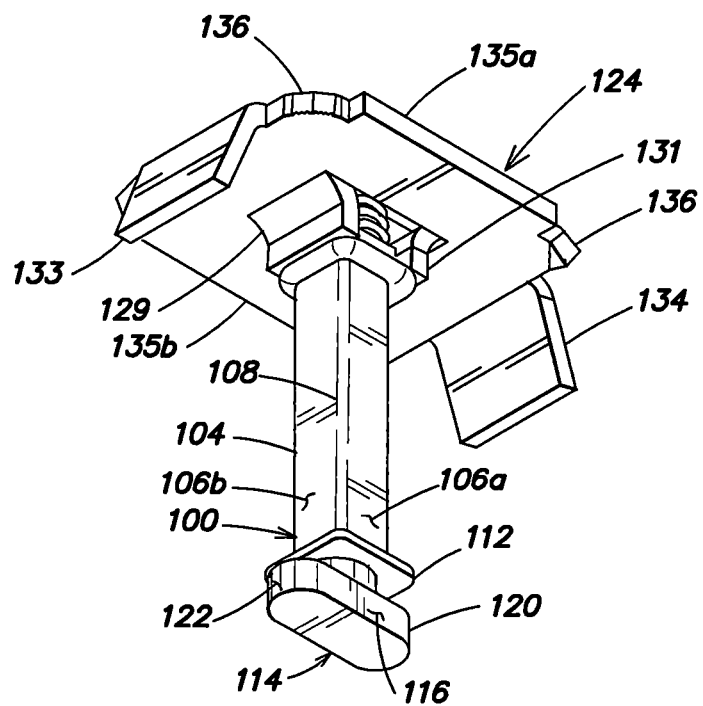
FIG. 6 is a second perspective view of the bolt of FIGS. 1-3 and the clamp of FIG. 4 operatively secured thereto.
Figure 7:
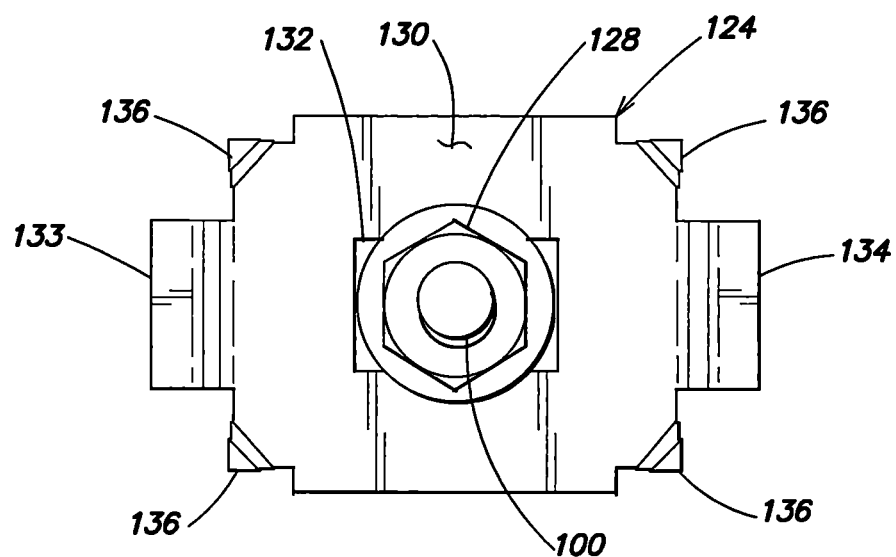
FIG. 7 is a top view of the bolt and the clamp assembly of FIGS. 5-6.
Figure 8:
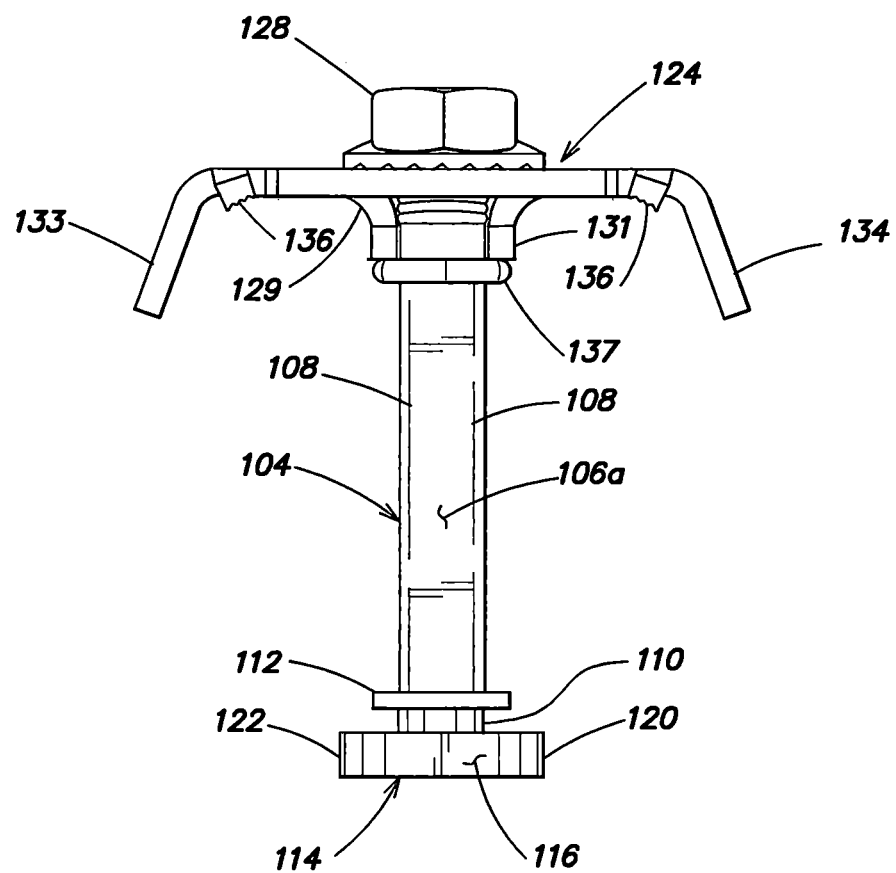
FIG. 8 is a first side view of the assembly of FIGS. 5-7.
Figure 9:
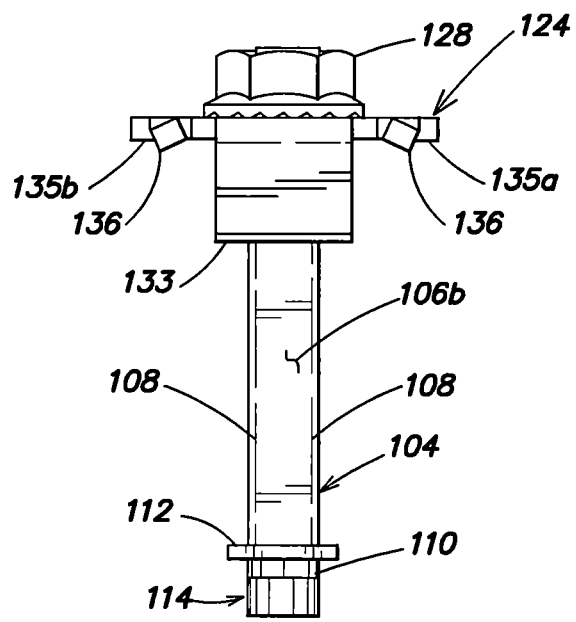
FIG. 9 is a second side view of the assembly of FIGS. 5-7.

FIG. 5 is a first perspective view of the bolt 100 and the clamp 124 operatively secured to the bolt with a fastener (e.g., a serrated flange nut) 128. The nut 128 may include a serrated bottom surface. In addition, the clamp 124 may also include a plurality of serrated edges 136 that point downwardly from the plane formed by the base surface 130, such that when the nut 128 is torqued the desired amount the serrated edges 136 bite into the object being clamped. Of course the size and shape of the central opening 132 in the base surface 130 of the clamp 124 is large enough to allow the externally threaded segment 102 to pass, but not so large that the fastener 128 does not contact sufficient area of the base surface 130 when torqued down. FIG. 6 is a second perspective view of the bolt 100 of FIGS. 1-3 and the clamp 124 of FIG. 4 operatively secured thereto. FIG. 7 is a top view of the bolt and the clamp of FIGS. 5-6. FIG. 8 is a first side view of the assembly of FIGS. 5-7, and FIG. 9 is a second side view of the assembly of FIGS. 5-7. Referring to FIGS. 4-9, a radially extending clamp support surface 137 (e.g., an O-ring) is located at the distal end of the externally threaded segment 102 and the radially extending clamp support surface 137 abuts the proximate end of the first shank segment 104. The clamp 124 is then positioned (e.g., co-axially) with respect to the externally threaded segment 102 of the bolt and the radially extending clamp support surface 137, and then the threaded nut 128 is placed on the threaded segment 102. FIG. 9 is a pictorial illustration of the assembly 124. The clamp 124 also includes support tabs 129, 131 that extend from the base surface 130 and contact the radially extending clamp support surface 137 to axially position the clamp on the bolt 100. The support tabs 129, 131 may be punched out from the base surface 130. The radially extending clamp support surface 137 may be a unitary part of the bolt 100, or a separate element such as an O-ring.

Figure 10:
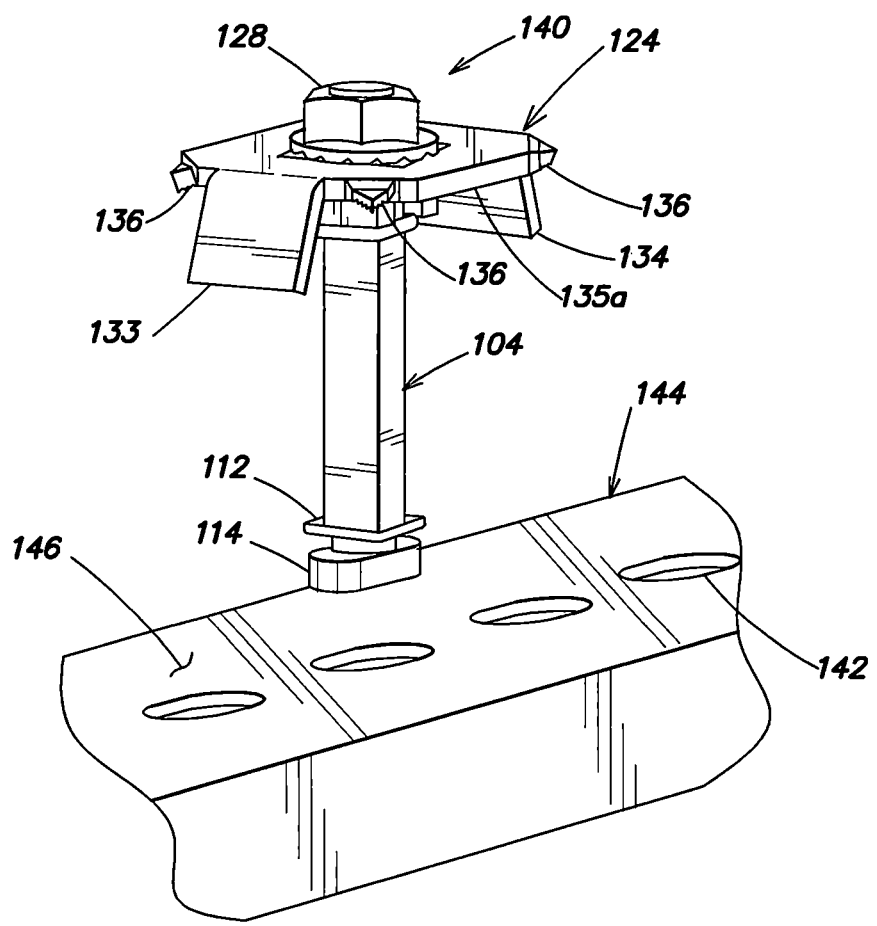
FIG. 10 is a pictorial illustration of a first bolt-clamp assembly positioned for insertion of the bolt head into a mounting aperture of a structural member.
Figure 11:
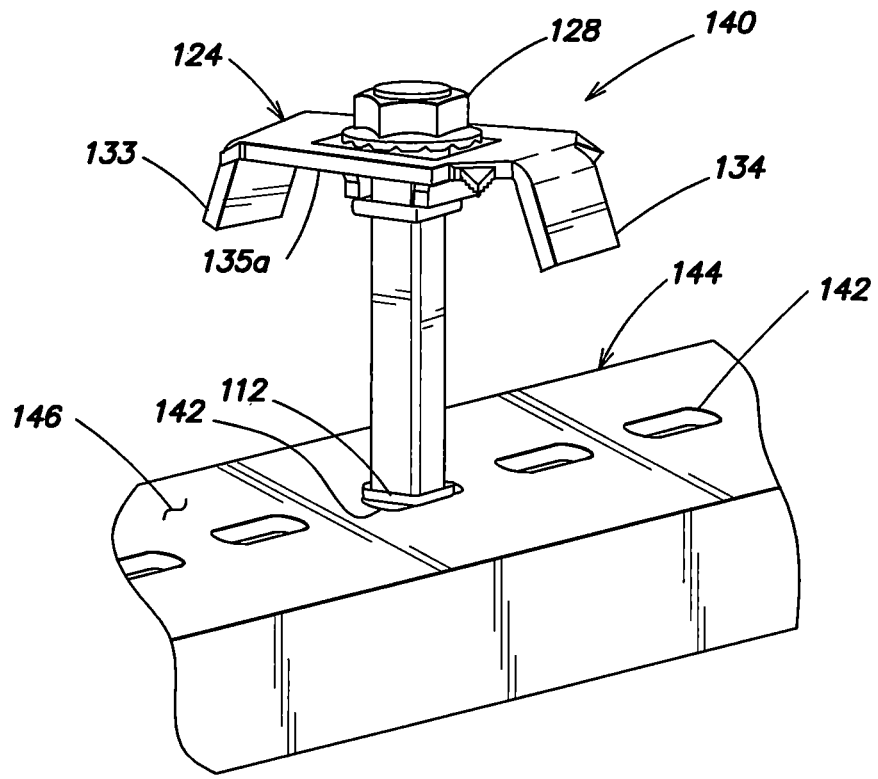
FIG. 11 is a pictorial illustration of the first bolt-clamp assembly of FIG. 10 rotated 90 degrees following insertion of the bolt head into the mounting aperture.

FIG. 10 is a pictorial illustration of an exemplary bolt-clamp assembly 140 of FIGS. 1-9 positioned for insertion of the head 114 into a mounting aperture 142 (e.g., a slot) in a structural member 144. For example, in one embodiment the slot 142 may be located in a purlin of a solar panel mounting rack. The shape of the slot 142 and the shape of the bolt flange 112 are such that only the head 114 passes through the slot 142 and the bolt flange 112 abuts surface 146 of the structural member 144. Once the head 114 is inserted into the slot 142, the bolt-clamp assembly 140 is rotated 90 degrees, which prevents the head from being withdrawn from the slot 142 until the bolt is rotated back such that the head 114 is aligned with the slot 142. Notably, the bolt flange 112 will hold the bolt-clamp assembly 140 upright in the slot 142. FIG. 11 is a pictorial illustration of the bolt-clamp assembly 140 rotated 90 degrees following insertion into the slot 142 as shown in FIG. 10. Since the bolt-clamp assembly 140 is configured as a mid-clamp, when solar panels are installed on opposing sides of the bolt-clamp assembly 140 the nut 128 is torqued and the opposing flange surfaces 135a, 135b of the bolt-clamp assembly 140 apply a force to their associated adjacent panel to firmly hold the panels in position, and the serrated edges 136 dig into surfaces of the installed panels to further secure the panels. The bent side portions 133, 134 space the installed panels.

Although FIGS. 10 and 11 illustrate the bolt 100 used with a mid-clamp, the bolt may be used with various clamps. For example, the bolt may be used, with an end clamp for installing solar panels in a rack.

Figure 12:
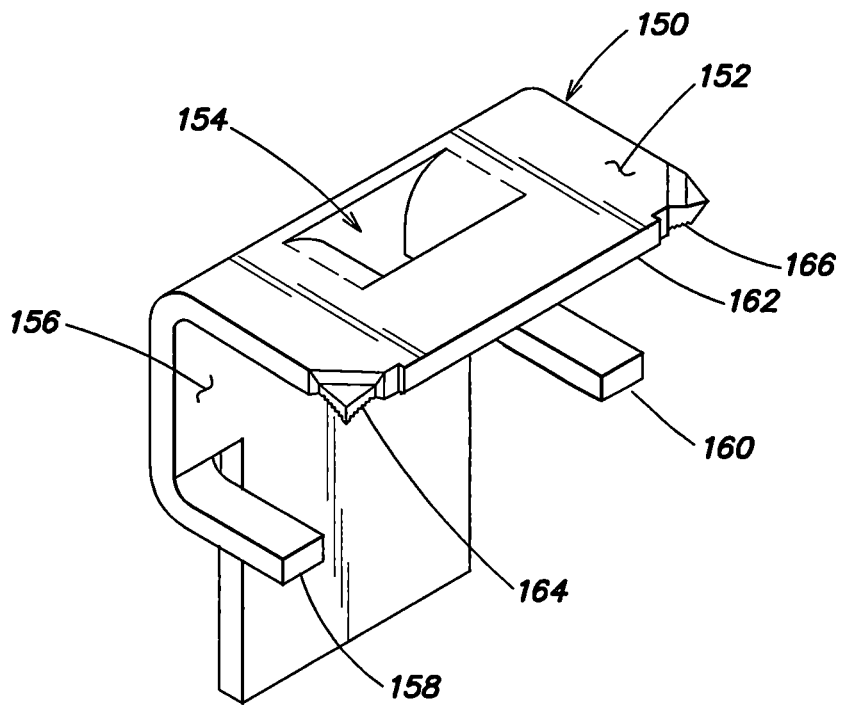
FIG. 12 is a pictorial illustration of a second exemplary embodiment of a clamp.

FIG. 12 is a pictorial illustration of a second exemplary embodiment of a clamp 150 (e.g., an end clamp). The end clamp 150 comprises a top surface 152 that includes an opening 154 formed therein, a sidewall surface 156 and spacing fingers 158, 160 extending from the sidewall surface 156. The top surface 152 extends from the sidewall surface 156 further than the spacing fingers 158, 160 to provide an end clamp flange 162 with serrated edges 164, 166 at corners thereof. The serrated edges 164, 166 preferably bend down slightly to bite into a clamped surface (not shown). Of course, more, less, or no serrations may be used.

Figure 13:
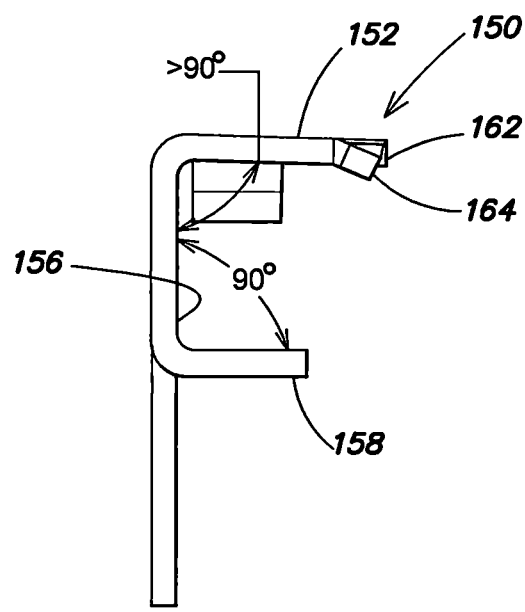
FIG. 13 is side view of the clamp illustrated in FIG. 12.

FIG. 13 is side view of the end clamp 150 illustrated in FIG. 12. Notably, in one exemplary embodiment the top surface 152 may be bent down slightly (e.g., a few degrees) so it is not perpendicular to the sidewall surface 156 or parallel to the spacing fingers 158, 160. In addition, the top surface 152 extends further from the sidewall surface 156 than the spacing fingers 158, 160 in order to provide the end clamp flange 162.

Figure 14:
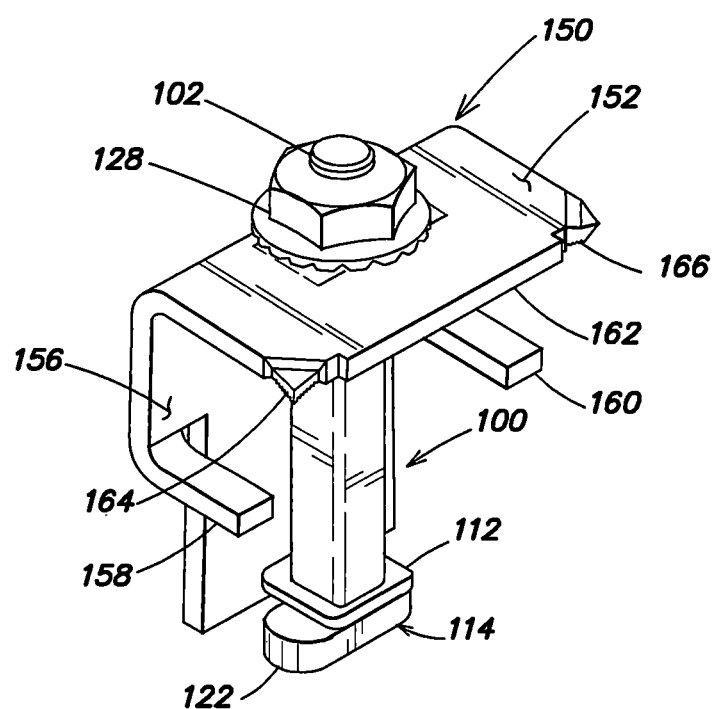
FIG. 14 is a first perspective view of the bolt of FIG. 1-3 and the clamp of FIGS. 12-13 operatively secured with a fastener.

FIG. 14 is a first perspective view of the bolt 100 of FIGS. 1-3 and the end clamp 150 of FIGS. 12-13 operatively secured with a fastener (e.g., a serrated flange nut).

Figure 15:
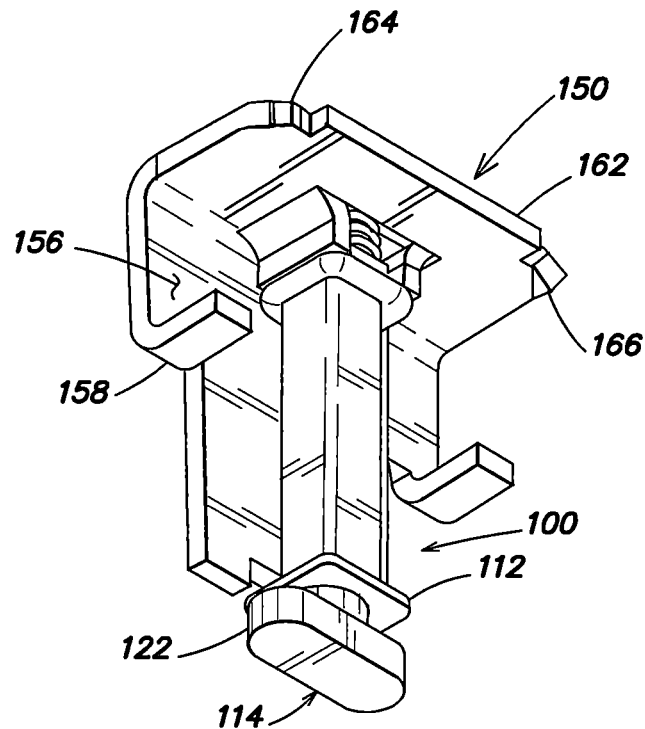
FIG. 15 is a second perspective view of the bolt of FIGS. 1-3 and the clamp of FIGS. 12-13.

FIG. 15 is a second perspective view of the bolt 100 of FIGS. 1-3 and the end clamp 150 of FIGS. 12-13 operatively secured thereto.

Figure 16:
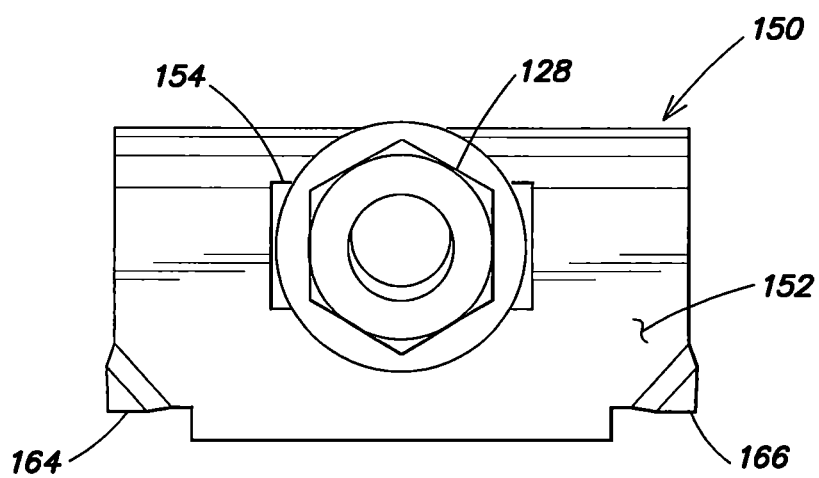
FIG. 16 is a top view of the bolt and the clamp assembly of FIGS. 14-15.
Figure 17:
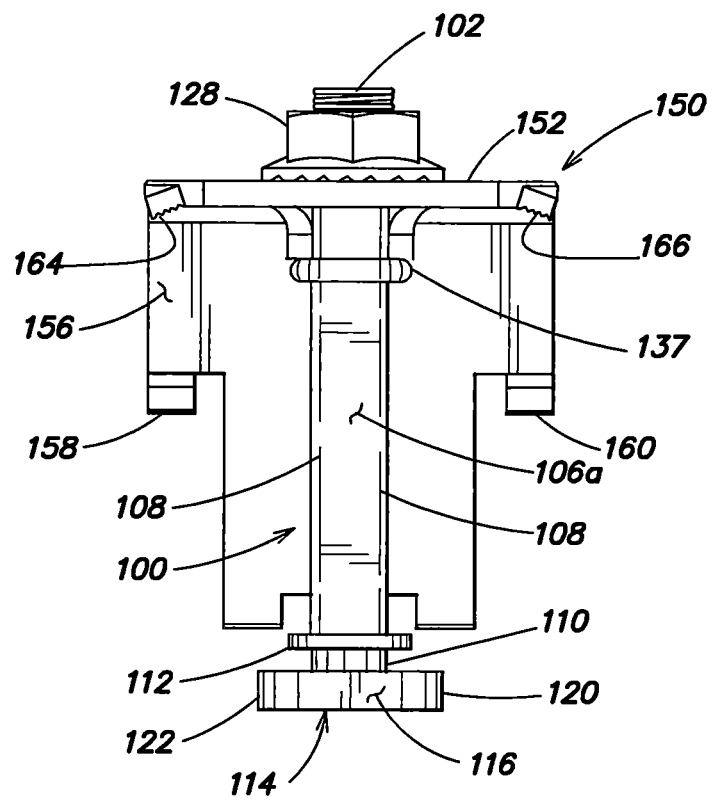
FIG. 17 is a first side view of the bolt and clamp assembly of FIGS. 14-16.
Figure 18:
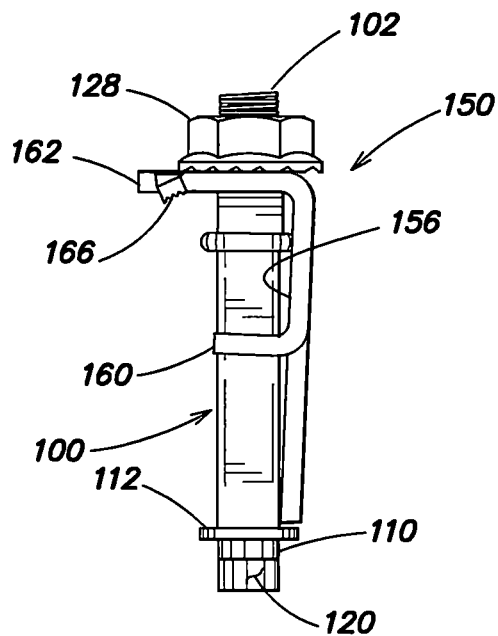
FIG. 18 is a second side view of the bolt and clamp assembly of FIGS. 14-16.

FIG. 16 is a top view of the bolt and the end clamp assembly of FIGS. 14-15. FIG. 17 is a first side view of the bolt and end clamp assembly of FIGS. 14-16. FIG. 18 is a second side view of the bolt and end clamp assembly of FIGS. 14-16.

The preassembled bolt and clamp assemblies illustrated, for example, in FIGS. 5-18 provide a substantial improvement in ease of and speed of installation of solar panel modules in a racking system. For example, as shown in FIGS. 10-11 the preassembled bolt and clamp assembly 140 can be placed in a purlin 144 (i.e., the head 114 is placed into the aperture 142 and then rotated 90 degrees to prevent the head from being removed from the aperture 142). The preassembled bolt and clamp assembly 140 remains upright in the aperture 142 ready to receive solar panel modules. Next solar panel modules are placed under an associated one of the opposing flange surfaces 135a, 135 and the nut 128 is torqued down to secure the solar panel modules in place against the surface 146 of the purlin 144. The preassembled bolt and clamp assemblies have been shown to allow about 400 solar panel modules to be installed per worker during a workday, which represents a substantial improvement over the nominal 100 solar panel modules installed per worker during a workday. Torqueing of the nut 128 causes the plurality of serrated edges 136 that point downwardly from the plane formed by the base surface 130 to bite into the frame (e.g., metallic) of the solar panel frame, which establishes a grounding path from the solar panel frame to the racking system.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:
1. An assembly comprising:
 (i) a bolt, comprising
  a first shank segment axially comprising an externally threaded segment at a proximate axial end of the bolt;
  a second shank segment co-axial with the first shank segment;
  a radially extending clamp support surface at a distal axial end of the externally threaded segment;
  a flange radially extending a first distance from the first shank segment and axially located between a distal axial end of the first shank segment and a proximate axial end of the second shank segment; and
  a head axially adjacent to a distal axial end of the second shank segment;
 (ii) a clamp comprising
  a base surface that includes an aperture and support tabs extending downwardly from the base surface at opposing sidewall ends of the aperture, where the externally threaded segment extends through the aperture and the support tabs contact the radially extending clamp support surface to position the clamp axially along the bolt; and
 (iii) a fastener that engages the externally threaded segment to secure the clamp to the bolt.

2. The assembly of claim 1, where the first shank segment comprises a segment comprising a plurality of sidewalls.

3. The assembly of claim 1, where the radially extending clamp support surface comprises an O-ring.

4. The assembly of claim 1, where the radially extending clamp support surface is unitary with the first shank segment.

5. The assembly of claim 1, where the clamp further comprises:
 an axial sidewall surface that is substantially parallel with the first shank segment and from which the top surface radially extends;
 first and second radial corners of the axial sidewall surface that comprise serrated edges that bend downwardly from the top surface; and
 first and second spacing fingers extending radially from the axial sidewall surface.

6. The assembly of claim 5, where the fastener comprises a serrated flange nut.

7. The assembly of claim 1, where the clamp further comprises:

serrated edges at corners of the top surface that bend downwardly from the top surface; and elongated downwardly bent side portions extending from radial end surfaces of the top surface.

8. The assembly of claim 7, where the head comprises first and second parallel sidewalls, a first corner radius separating the first and second parallel sidewalls at a first end, and a second corner radius separating the first and second parallel sidewalls at a second end.

9. The assembly of claim 8, where the first shank segment has a polygonal cross section along an axial plane and where the radially extending clamp support surface is formed by one of an O-ring or is integral with the bolt.

* * * * *